United States Patent
Jang et al.

(10) Patent No.: US 8,769,488 B2
(45) Date of Patent: Jul. 1, 2014

(54) COMPONENT COMPOSING APPARATUS AND METHOD USING VIRTUAL COMPONENTS IN COMPONENT-BASED ROBOT SOFTWARE DEVELOPMENT

(75) Inventors: Choulsoo Jang, Daejeon (KR); Byoung Youl Song, Daejeon (KR); Seung-Woog Jung, Daejeon (KR); Sung Hoon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 29 days.

(21) Appl. No.: 13/595,256

(22) Filed: Aug. 27, 2012

(65) Prior Publication Data

US 2013/0067429 A1 Mar. 14, 2013

(30) Foreign Application Priority Data

Sep. 14, 2011 (KR) .......................... 10-2011-0092553

(51) Int. Cl.
*G06F 9/44* (2006.01)
(52) U.S. Cl.
USPC .......................................... 717/106; 110/120
(58) Field of Classification Search
None
See application file for complete search history.

(56) References Cited

U.S. PATENT DOCUMENTS

| | | | |
|---|---|---|---|
| 2003/0126583 | A1 | 7/2003 | Cho et al. |
| 2007/0208442 | A1* | 9/2007 | Perrone .......................... 700/95 |
| 2007/0229537 | A1 | 10/2007 | Kohli et al. |
| 2009/0106011 | A1 | 4/2009 | Chen et al. |
| 2010/0192125 | A1 | 7/2010 | Son et al. |

FOREIGN PATENT DOCUMENTS

| | | |
|---|---|---|
| KR | 2003-0056698 | 7/2003 |
| KR | 1020090033633 | 4/2009 |
| KR | 1020090040840 | 4/2009 |

* cited by examiner

*Primary Examiner* — Chuck Kendall
(74) *Attorney, Agent, or Firm* — Nelson Mullins Riley & Scarborough LLP; Anthony A. Laurentano, Esq.; Lewis Lee, Esq.

(57) ABSTRACT

A component composing apparatus using virtual components in component-based robot software development, includes a component repository configured to store a plurality of components having at least one port; and an application diagram generation unit configured to create an application diagram by selecting the components stored in the component repository. Further, the component composing apparatus includes an information repository configured to store the components within the application diagram and port information of the components within the application diagram and port connection information between the components within the application diagram; and a virtual component processing unit configured to create the virtual components for components selected by a user among the components within the application diagram.

8 Claims, 5 Drawing Sheets

FIG. 4A

| Component ID | Component Name | Position (x,y) | Is_Virtual | Pointer_of_ portList |
|---|---|---|---|---|
| | | | | |
| | | | | |
| | | | | |
| | | | | |

FIG. 4B

| Port ID | Port Name | Port Type | Position (x,y) |
|---|---|---|---|
| | | | |
| | | | |
| | | | |
| | | | |

FIG. 4C

| Source Component ID | Source Port ID | Target Component ID | Target Port ID |
|---|---|---|---|
| | | | |
| | | | |
| | | | |
| | | | |

COMPONENT COMPOSING APPARATUS AND METHOD USING VIRTUAL COMPONENTS IN COMPONENT-BASED ROBOT SOFTWARE DEVELOPMENT

CROSS-REFERENCE TO RELATED APPLICATION(S)

The present invention claims priority of Korean Patent Application No. 10-2011-0092553, filed on Sep. 14, 2011, which is incorporated herein by reference.

FIELD OF THE INVENTION

The present invention relates to a component composition for generating robot software; and more particularly, to a component composing apparatus and method using virtual components in component-based robot software development, and a recording medium of program related thereto capable of simplifying complicated connection relation so as to participate in an application diagram by copying the virtual components such as components selected from components participating in the application diagram for robot applications.

BACKGROUND OF THE INVENTION

Generally, robot software components are a software module that can be reused and replaced and configure robot applications only by composing components without knowing detailed implementations of a corresponding interface, by using only an interface provided by components in the viewpoint of an external component user.

Robot components used in a robot software structure each have an internal state and are operated as an active type and perform a robot control while performing data exchange and a method call between components through a component interface. Recently, so as to support features of a robot, open platform for robotic services (OPRoS), robot technology component (RTC), open robot control software (Orocos), an robot operation system (ROS), and the like, have proposed a robot programming type using an active pattern type of components.

Individual components made in accordance with the foregoing component-based-development methodology serve as an agent for real-world devices and various algorithms. Robot developers compose previously and independently tested components to complete robot services.

Meanwhile, the components may be combined by component composing tools. The component composing tools is a graphical user interface (GUI) based modeling tool that can allow robot service developers to connect the individual components with each other on an application diagram to complete services. When components are composed using the GUI-based component composing tool, a system can complete by easily composing components while visually confirming how to connect an interface port of components with other components.

As various devices configuring the robot so as for the robot to provide various services are increased and several algorithms are added, the number of components representing various devices and algorithms is increased and the connection relationship between components for combining them is increased in proportion thereto.

Therefore, when intending to represent the connection relationship of too many components in an application diagram using a GUI-based component composing apparatus, the connection lines represented on the application diagram is very complicated due to problems of connection lines intersecting each other, connection between the components far away from each other, connection with component interface ports facing each other, and the like, which results in hindering the understanding of a configuration of the system. Therefore, it is difficult to complete the system through the components composing.

SUMMARY OF THE INVENTION

In view of the above, the present invention provides a component composing apparatus and method using virtual components in component-based robot software development and a recording medium of program related thereto capable of completing a robot application program by simplifying a connection relationship between components on a diagram and more easily composing components when composing the components for generating application software for a robot.

Objects of the embodiment of the present invention are not limited the above-mentioned objects and other objects may be apparently understood to a person skilled in the art to which the present invention pertains from the following description.

In accordance with a first aspect of the present invention, there is provided a component composing apparatus using virtual components in component-based robot software development, including: a component repository configured to store a plurality of components having at least one port; an application diagram generation unit configured to create an application diagram by selecting the components stored in the component repository; an information repository configured to store the components within the application diagram and port information of the components within the application diagram and port connection information between the components within the application diagram; and a virtual component processing unit configured to create the virtual components for components selected by a user among the components within the application diagram.

In accordance with a second aspect of the present invention, there is provided component composing method using virtual components in component-based robot software development, including: creating an application diagram using components selected by a user among components stored in a component repository in which a plurality of components having at least one port are stored; creating port connection information between components within the application diagram according to connection ports between components within the application diagram and storing the generated port connection information in the information repository; creating the virtual components for the components selected by the user among the components within the application diagram; and connecting the ports of the virtual components with ports of arbitrary components within the application diagram.

In accordance with the embodiments of the present invention, it is possible to reduce the complexity of application software for a robot and simplify the connection relationship between components by using the virtual components when composing the components for configuring application software for a robot.

BRIEF DESCRIPTION OF THE DRAWINGS

The objects and features of the present invention will become apparent from the following description of embodiments given in conjunction with the accompanying drawings, in which:

FIG. 4A is a diagram illustrating a structure of a component list that is managed by the component composing apparatus shown in FIG. 3;

FIG. 4B is a diagram illustrating a structure of a port list that is managed by the component composing apparatus shown in FIG. 3;

FIG. 4C is a diagram illustrating a structure of a port connection list that is managed by the component composing apparatus shown in FIG. 3.

DETAILED DESCRIPTION OF THE EMBODIMENTS

Figure 1:
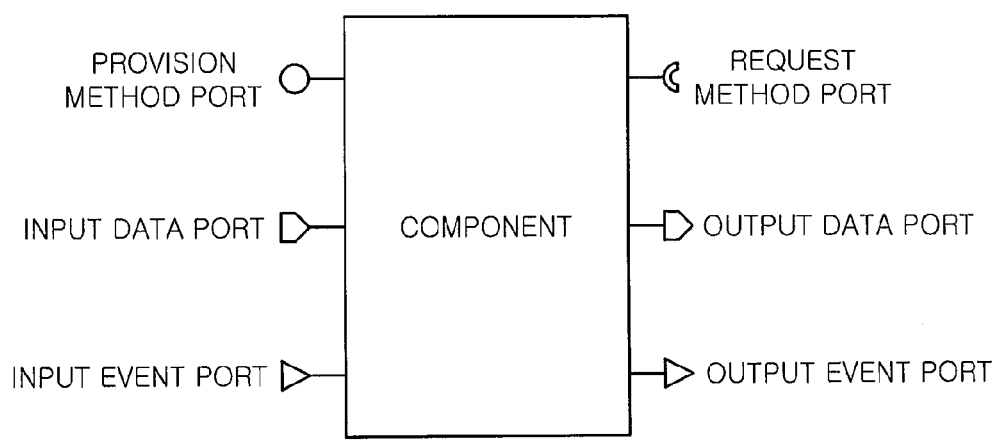
FIG. 1 is a diagram for describing a structure of components to which an embodiment of the present invention is applied.

Embodiments of the present invention will be described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

In the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms need to be defined throughout the description of the present invention.

Hereinafter, a component composing apparatus and method in accordance with embodiments of the present invention will be described with reference to the accompanying drawings.

Prior to description, robot services are configured by connection of components and as a method for lowering a coupling degree between components, a method for connecting components through a port has been used. The port means a point at which components interacts external environment. Components are connected with other components through the port to perform intercommunication. There is no need to know detailed implementations of a corresponding interface, by using only an interface provided by components through a port in the viewpoint of an external component user. That is, the components become a black box of which the contents cannot be understood, except for an interface opened to the outside. Therefore, the internal implementation of the components can be freely changed unless the external interface is changed.

The components are connected with each other in the component-based robot software to perform communications. That is, the connection between the components is implemented by the connection between ports of transmitting components and ports of receiving components. In this case, various communication methods are used according to an information type between the robot software components. An example of the communication methods may include a communication method of calling a remote method between the components like a remote procedure call (RPC), a method of periodically transmitting data between components, a method of transferring events intermittently created, and the like.

The components may arbitrarily select and use required methods among these methods. As shown in FIG. 1, for example, in case of open platform for robotic services (OPRoS), a request method port may be disposed when there is a need to call external methods through a method port for the RPC and a provision method port may be disposed when there is a need to provide services to the outside. In addition, when intending to periodically transmit data to the outside, an output data port may be disposed and when intending to periodically receive data from the outside, the input data port may be disposed. Similarly, and input event port and an output event port for events may be disposed.

Figure 2:
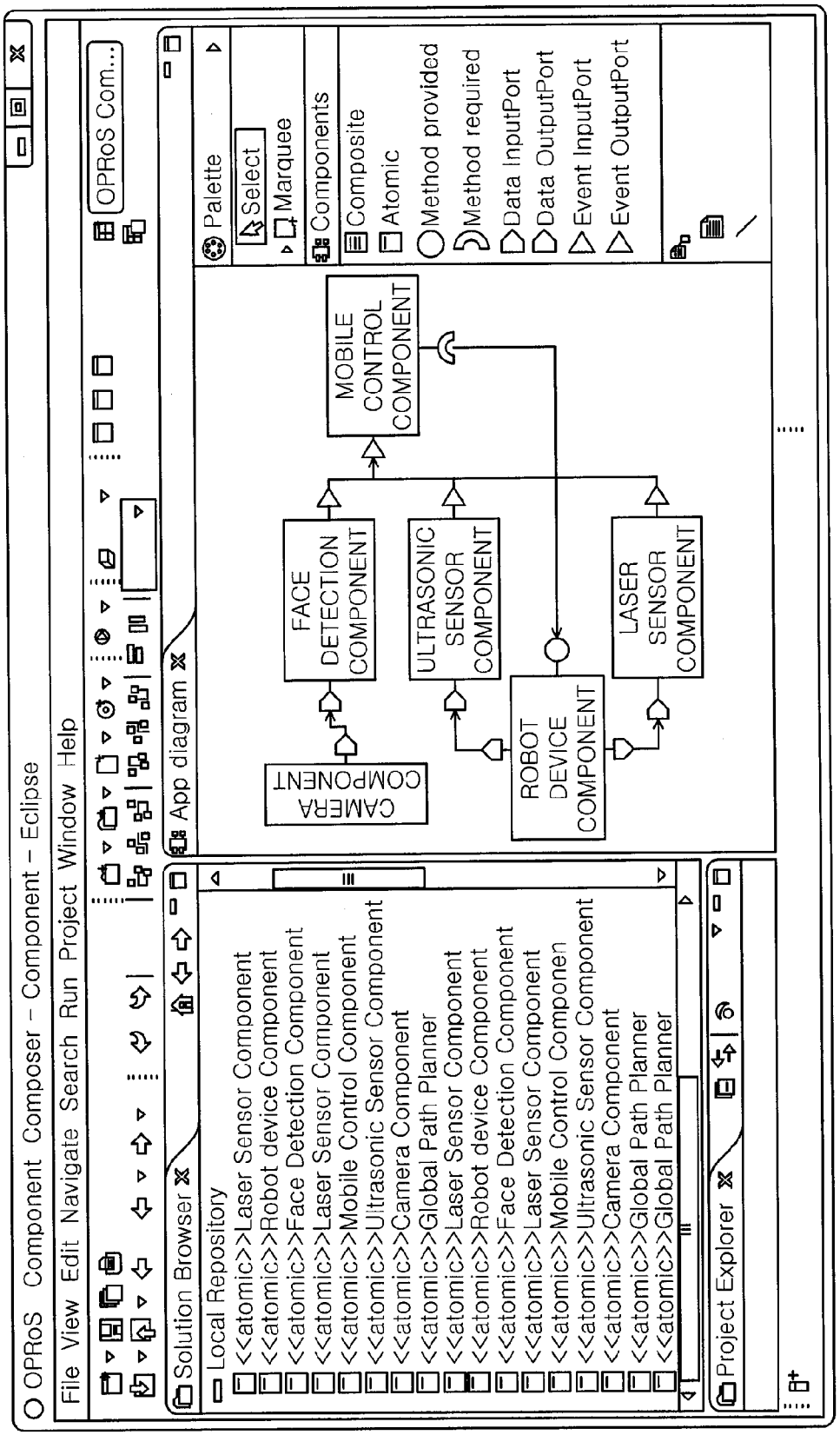
FIG. 2 is a diagram illustrating an interface screen of an application diagram to which the embodiment of the present invention is applied.

Meanwhile, component composing tools are used to create robot applications by composing the components. The component composing tools have repositories capable of storing individually created components and thus, are displayed on, as a list, a component composing tool screen in types like icons so as for the components stored in the repositories to be used for robot application development. As shown in FIG. 2, when robot application developers drag individual components displayed in the list by using a mouse device and dispose the dragged components in an application diagram window, interface ports owned by components are displayed thereon and the robot application developers connect the ports between the components to create the robot applications.

Figure 3:
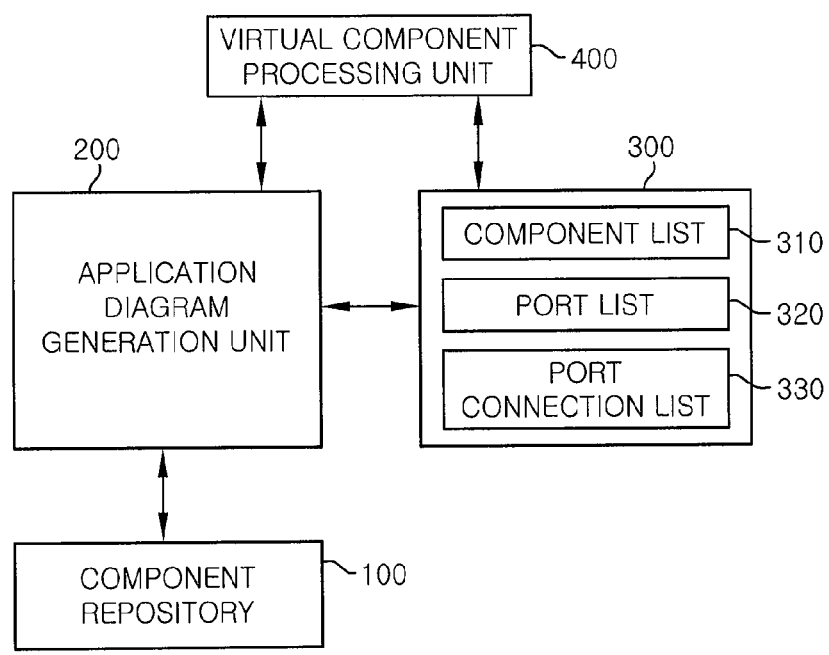
FIG. 3 is a block diagram of a component composing apparatus using virtual components in component-based robot software development in accordance with the embodiment of the present invention.

FIG. 3 is a block diagram illustrating an internal configuration of a component composing apparatus using virtual components in accordance with an embodiment of the present invention, which may include a component repository 100 in which the components are stored, an application diagram generation unit 200 that uses the components stored in the component repository 100 to create the application diagram, an information repository 300 in which information of the components included within the application diagram is stored, and a component processing unit 400 that creates or deletes the virtual components within the application diagram, and the like.

The information repository 300 includes a component list 310 in which list information of the components participating in the application diagram are stored, a port list 320 in which information of the ports used by each component within the component list 310 is stored, and a port connection list 330 in which information of a port connection relationship between each component within the component list 310 is stored, and the like.

The application diagram generation unit 200 may display the components stored in the component repository 100 on a screen and create an application diagram by using components selected by the user among the displayed components. In this case, the application diagram generation unit 200 may use the information of the components selected by the user and the port information owned by the selected components to update the component list 310 and the port list 320 within the information repository 300.

Further, the application diagram generation unit 200 may update the port connection list 330 within the information repository 300 in which the information is stored, by allowing the user to define the port connection between the displayed components on the application diagram. As illustrated in FIG. 4A, the component list 310 may be configured to include component IDs, component names, positions, an identifier Is_Virtual indicating whether the corresponding components are virtual, a reference Pointer_of_PortList for ports owned by the corresponding components, and the like.

As shown in FIG. 4B, the port list 320 may be created using the reference within the component list 310 and may be configured to include port IDs, port names, port types, and port positions of the corresponding component, and the like.

As shown in FIG. 4C, the port connection list 330 may be created based on the connection relationship between each component within the application diagram, that is, a source and target connection relationship and may be configured to include a source component ID, a source port ID, a target component ID, a target port ID, and the like.

Referring back to FIG. 3, the identifier, e.g., a flag Is_Virtual flag on whether the components participating in the application diagram are real components or virtual components is set in the component list 310 in accordance with the embodiment of the present invention.

The virtual component processing unit 400 may create the virtual components for components selected by the user within the application diagram according to a user request and may store the information of the created virtual components in the component list 310. Herein, the information of the virtual components may be generated by copying the information of the components (real components) selected by the user within the component list 310.

That is, the virtual component processing unit 400 creates new rows on the component list 310 by copying the information of the real component and then, corrects the created row for the component IDs to have a unique value, thereby generating the information of the virtual components in the component list 310. In this case, identifier values of the virtual components may be "Y (Yes)".

In addition, the virtual component processing unit 400 may provide an interface that can designate a position at which the virtual components are created and create the virtual components at a position which is designated through the interface.

The virtual component processing unit 400 may be created using the port information and the port connection information of the virtual components using the information repository 300 in which the information of the real components is stored, when the virtual components are created and update the port list 320 and the port connection list 330 within the information repository 300 using the information of the created virtual components.

Meanwhile, the virtual component processing unit 400 may update the information repository 300 when the real components having the virtual components are deleted within the application diagram, that is, delete the information of the virtual components in the component list 310, the port list 320, and the port connection list 330.

In accordance with the embodiment of the present invention, the virtual components are used when composing the components to configure robot software, thereby simplifying the connection relationship between the components while reducing complexity of the robot software.

The component composing apparatus in accordance with the embodiment of the present invention may be implemented by installing in a computer a recording medium having programs composing the components in a system developing component-based robot software. That is, the component composing apparatus may be implemented by a computer-readable recording medium having programs that creates the application diagram using components selected by the user among components stored in the component repository 100 in which a plurality of components having at least one port are stored, generates virtual components for the components selected by the user among the components within the application diagram, connects the ports of the virtual components with ports of any components within the application diagram, and deletes the virtual components according to the deletion of the components selected by the user.

Figure 5:
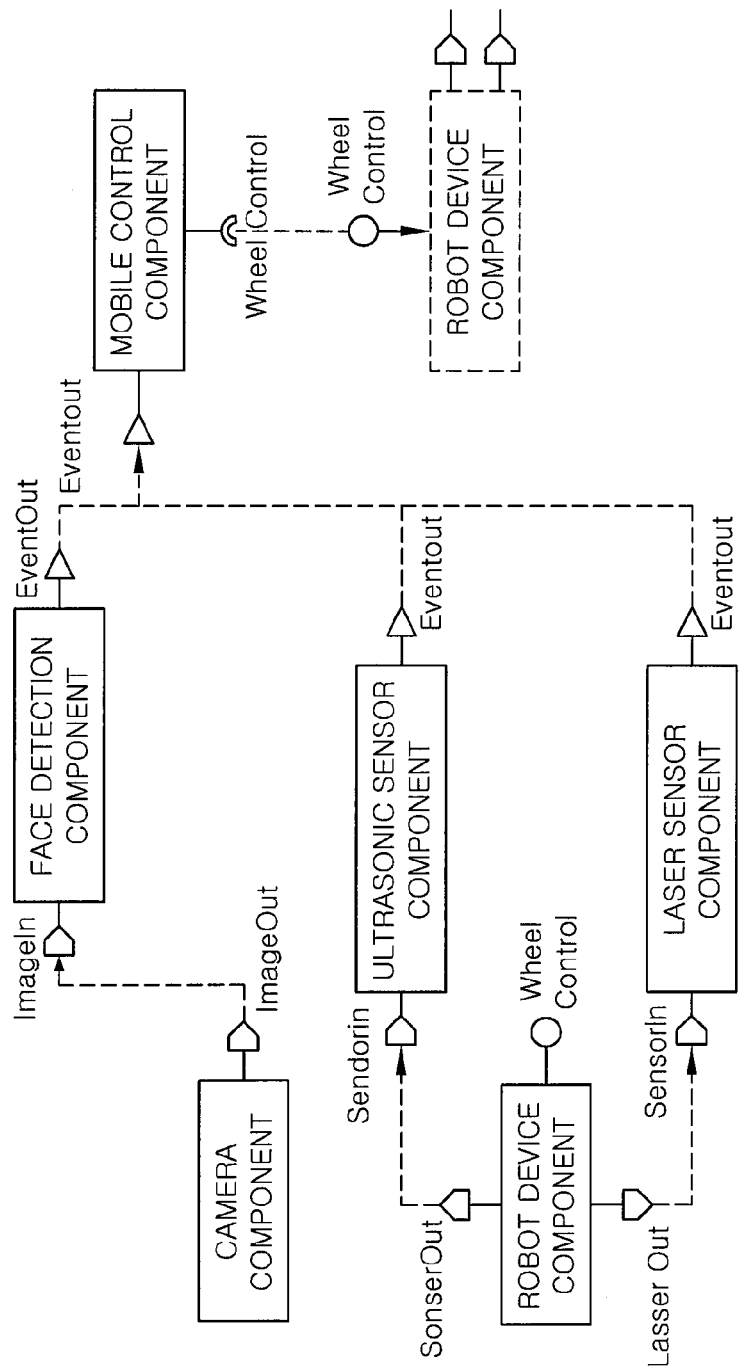
FIG. 5 is an exemplified diagram for describing a process for the component composing apparatus in accordance with the embodiment of the present invention to create virtual components.

A process of operating the component composing apparatus using the virtual components having the foregoing configuration will be described with reference to FIG. 5.

First, the component composing apparatus displays the components stored in the component repository 100 on the screen and then, uses the components selected by the user among the displayed components, thereby configuring the application diagram. That is, the application diagram generation unit 200 displays the components selected by the user on a screen and sets the port connection between the displayed components, thereby create the application diagram.

When too many components are required during the configuration of the application diagram, the connection lines between the components may intersect each other, the components far away from each other may be connected with each other, the connection between the component ports facing each other may be connected with each other, and the like. In this case, the virtual components may be created at a position on the application diagram designated by the user using the components arbitrarily selected according to the user request. For example, as shown in FIG. 5, the application diagram is configured using a camera component, a face detection component, an ultrasonic sensor component, a robot device component, a laser sensor component, a mobile control component, and the like and when intending to connect wheel control method ports of the robot device component with wheel control method ports of a mobile control component during the process of generating the connection line connecting the ports between respective components, the virtual robot device components corresponding to the robot device components may be created around the mobile control components. That is, when the user selects the robot device components and then, operates the predetermined interface (virtual component creating menu), the virtual component processing unit 400 creates the virtual robot device components corresponding to the robot device components and then, creates the created robot device components around the mobile control components or a position designated by a user.

In this case, the virtual component processing unit 400 may create the information of the virtual robot device components, that is, copy the information of the robot device components existing on the component list 310, create new rows on the component list 310, and then, correct the created new rows for the component IDs to have a unique value, thereby generating the information of the virtual robot device components in the component list 310. In this case, the identifier values of the virtual components may be "Y (Yes)".

Meanwhile, when the wheel control ports of the virtual robot device components are connected with the wheel control ports of the mobile control components, the port connection information for the robot device components within the port connection list 330 may be updated.

When the virtual robot device components are deleted on the application diagram, both of the real robot device components and the virtual robot device components are deleted, the information of the robot device components and the virtual robot device components within the information repository 300 may be deleted.

In accordance with the embodiments of the present invention, it is possible to simplify the complicated connection relationship by copying the virtual components like the selected components among the components participating in the application diagram for robot applications and making the copied virtual components participate in the application diagram.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A component composing apparatus using virtual components in component-based robot software development, comprising:
    a component repository configured to store a plurality of ports and a plurality of components having at least one port of the plurality of ports;
    an application diagram generation unit configured to create an application diagram by selecting the components stored in the component repository;
    an information repository configured to store the components within the application diagram and port information of the components within the application diagram and port connection information between the components within the application diagram; and
    a virtual component processing unit configured to create the virtual components for components selected by a user among the components within the application diagram and to generate the virtual components at a position designated by an interface.

2. The component composing apparatus of claim 1, wherein the virtual component processing unit provides the interface designating positions of the virtual components and generates the virtual components at the position designated by the interface.

3. The component composing apparatus of claim 1, wherein the virtual component processing unit generates information of the virtual components using the information of the selected components within the information repository, sets identifier values for differentiating the selected components from the virtual components, and generates the information of the virtual components.

4. The component composing apparatus of claim 1, wherein the virtual component processing unit deletes the virtual components within the application diagram when components corresponding to the virtual components are deleted.

5. A component composing method using virtual components in component-based robot software development in component composing apparatus, comprising:
    creating an application diagram using components selected by a user among components stored in a component repository in which a plurality of ports and a plurality of components having at least one port of the plurality of ports are stored;
    creating port connection information between components within the application diagram according to connection ports between components within the application diagram and storing the generated port connection information in the information repository;
    creating the virtual components for the components selected by the user among the components within the application diagram;
    generating the virtual components at a position designated by an interface; and
    connecting the ports of the virtual components with ports of arbitrary components within the application diagram.

6. The component composing method of claim 5, wherein said creating the virtual components includes:
    providing the interface designating positions of the virtual components; and
    creating the virtual components at the position designated by the interface.

7. The component composing method of claim 5, wherein said creating the virtual components further includes:
    copying information of the selected components within the information repository; and
    changing component IDs from the information of the copied selected components and setting identifier values for differentiating the selected components form the virtual components to generate information of the virtual components.

8. The component composing method of claim 5, further comprising deleting the virtual components within the application diagram when components corresponding to the virtual components are deleted.

* * * * *